June 21, 1949.                O. COLQUITT                2,474,094
                    COMBINATION WATER TANK AND TRUCK BODY
Filed Aug. 27, 1946                                 2 Sheets-Sheet 1
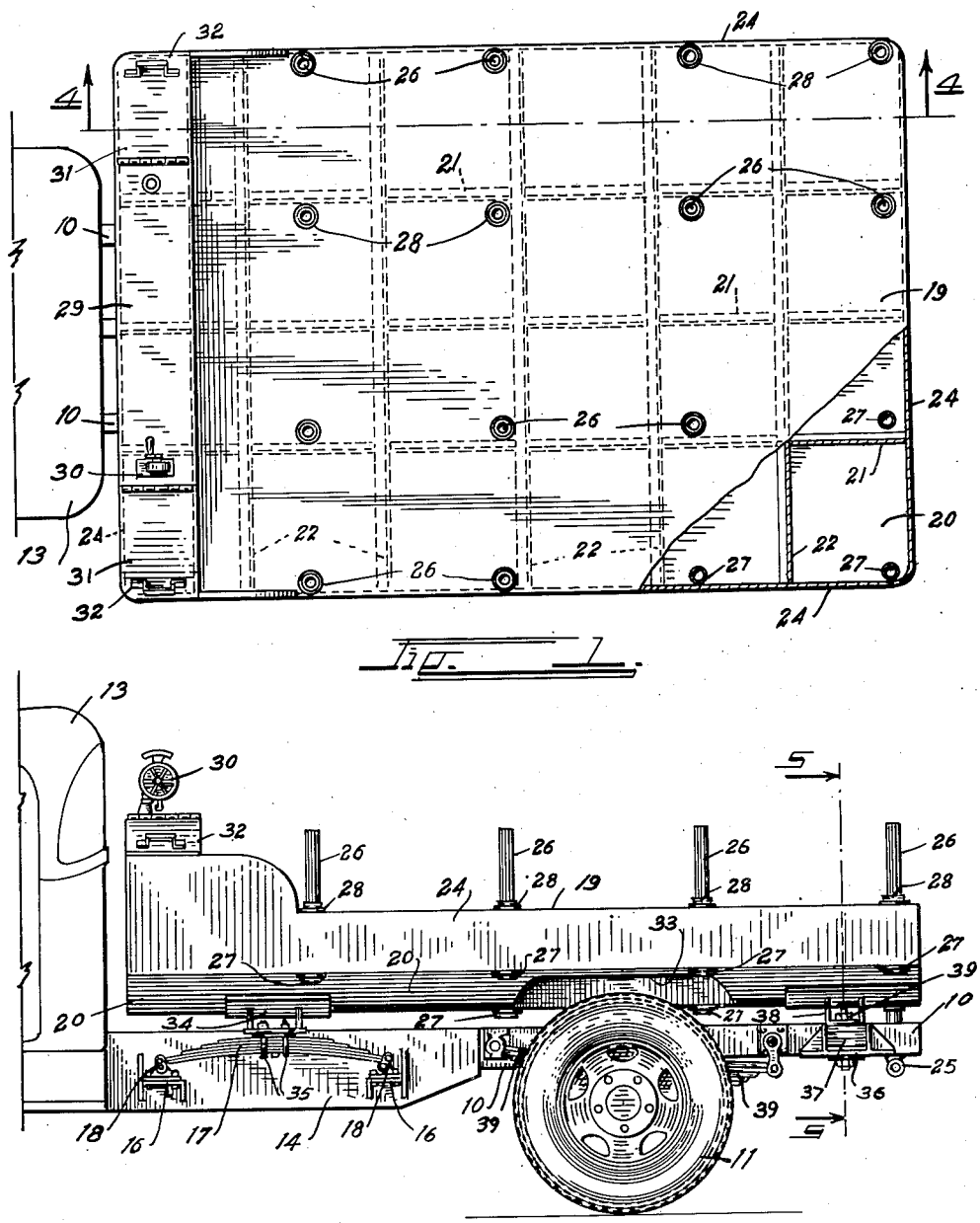
INVENTOR.
ODIE COLQUITT.
BY
ATTORNEY.

June 21, 1949.  O. COLQUITT  2,474,094
COMBINATION WATER TANK AND TRUCK BODY
Filed Aug. 27, 1946  2 Sheets-Sheet 2
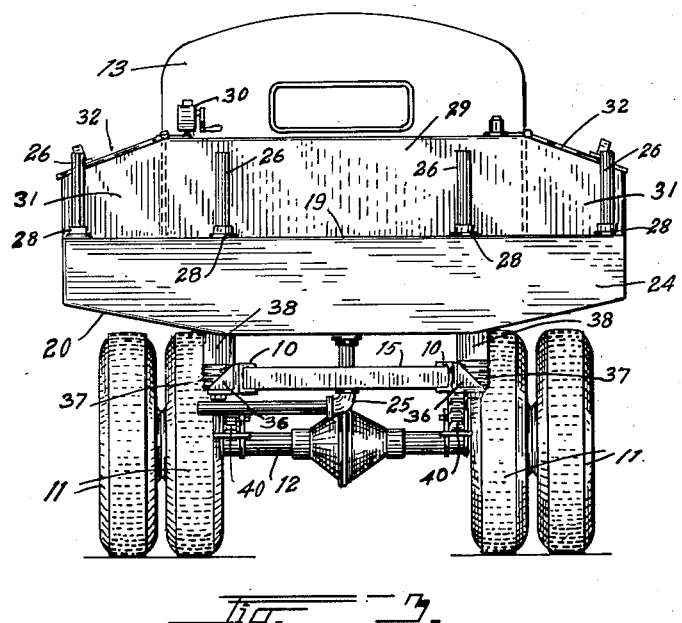
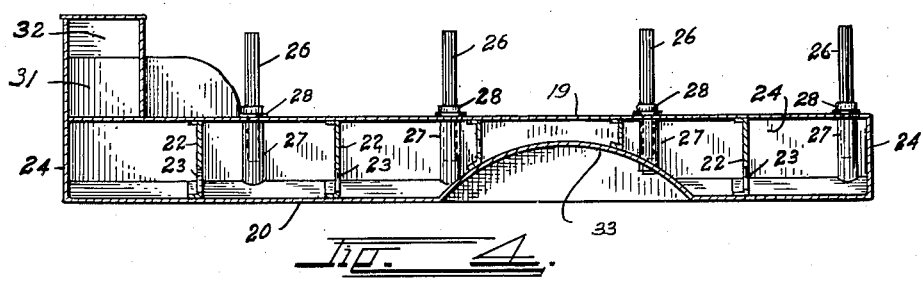
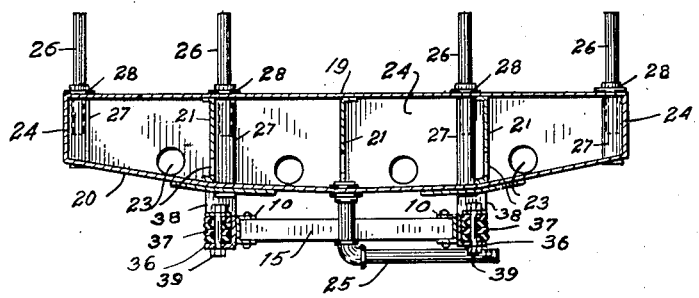
INVENTOR.
ODIE COLQUITT.
BY
ATTORNEY.

Patented June 21, 1949

2,474,094

UNITED STATES PATENT OFFICE 2,474,094

COMBINATION WATER TANK AND TRUCK BODY

Odie Colquitt, Denver, Colo., assignor to Patents, Inc., Denver, Colo., a corporation of Colorado Application August 27, 1946, Serial No. 693,355

2 Claims. (Cl. 280—5)

This invention relates to a combination water tank and platform truck. In certain industries, more particularly in the oil well drilling art, it is usually necessary to transport both the tools and equipment and the industrial and potable water to the job by truck. This requires separate water tank trucks and cargo trucks.

The principal object of this invention is to combine in a single truck both of these utilities without interference with the capacity and portability of either.

Other objects of the invention are to so construct the tank portion of the truck that splashing and surging of the water will be eliminated, and so that strains and stresses from the truck chassis due to uneven road conditions will not be transferred to the tank structure.

A further object of the invention is to so construct the truck that the usual cargo deck or platform will be replaced by a water carrying tank without interference with the loading and unloading procedures and without increasing the size or height of the vehicle.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the body portion of the improved combination tank and cargo carrying truck, partially broken away to show the interior construction;

Fig. 2 is a side view thereof;

Fig. 3 is a rear view thereof;

Fig. 4 is a longitudinal section, taken on the line 4—4, Fig. 1; and

Fig. 5 is a cross-section, taken on the line 5—5, Fig. 2.

Conventional parts of an automotive truck are indicated by numeral on the drawing as follows: chassis 10, chassis spring 40, rear wheels 11, rear axle housing 12, and cab 13. In the conventional truck a plurality of longitudinal and lateral beams are mounted on the chassis 10 to support a cargo deck. These beams and deck are replaced by the present invention.

The invention is applied to a chassis 10 by placing a side plate 14 on each side thereof and by placing a stiffening cross strut 15 between the side members thereof adjacent the rear. A pair of spring brackets 16 are formed or secured on each of the side plates 14 to support a leaf spring 17 thereon through the medium of suitable spring shackles 18.

The body portion of the invention comprises a relatively flat horizontal platform or deck plate 19 supported from a bottom plate 20 upon a plurality of longitudinally extending partition plates 21 and a plurality of cross partition plates 22. The partition plates 21 and 22 are provided with suitable intercommunicating openings 23 and are welded or otherwise secured to both the deck plate 19 and the bottom plate 20 to prevent vertical separation thereof.

The entire periphery of the space between the plates 19 and 20 is enclosed and sealed by edge plates 24 which are welded along their top edges to the deck plate 19 and along their bottom edges to the bottom plate 20 to form a fluid-tight enclosure or tank between the plates 19 and 20. This enclosure is used as a water storage tank, an intake and discharge pipe 25 being provided.

In the oil well industry water tanks are filled from water holes, lakes, creeks, and rivers, especially during "wild catting" operations. The filling is accomplished by connecting the tank with the intake manifold of the truck engine so that during the trip to the water hole the air will be evacuated from the tank. Upon arrival at the water hole the filling hose is immersed in the water and the valve opened to allow the atmospheric pressure to force the water into the tank.

The above filling procedure forms no part of the present invention. It is desired to call attention to it, however, to show that the tank is at times subjected to external atmospheric pressure against a partial vacuum therein which might result in collapsing the tank. This is prevented in the present invention by the closely-spaced longitudinally and transversely extending partitions 21 and 22 which rigidly maintain the two plates 19 and 20 separated. The partitions also serve other purposes in that they provide a substantial support for the deck plate 19 so that it may in turn support relatively heavy loads and they act as baffles to prevent surging of the water in the tank.

The deck plate is mainly intended, in the present invention, to hold drill pipe and drilling tools. The drill pipe is held in place on the platform plate by means of removable stakes 26. The stakes are insertable in receiving tubes 27 arranged in alignment throughout the area of the deck, as shown in Fig. 1. The tubes 27 pass entirely through both plates 19 and 20 and are welded or otherwise sealed thereto so as not to interfere with the hermetic seal of the tank and to provide additional stiffness thereto.

Each of the stakes 26 carries an integral flange 28 intermediate its extremities which limits its insertion into the tubes 27.

The plate 19 supports at its forward extremity an auxiliary fuel tank 29, provided with a filling pump 30, for carrying auxiliary fuel for the truck engine. A tool chest 31 is provided at each side of the tank 29. The chests are accessible through hinged lids 32. The bottom plate 20 is indented upwardly, as shown at 33, to provide clearance for rear wheels 11.

A spring rest member 34 is secured adjacent each side of the bottom plate 20 near its forward extremity. The rest members 34 are bolted to the springs 17 by means of suitable U-bolts 35 to resiliently support the forward extremity of the tank.

A shelf member 36 is secured to each side of the chassis 10 adjacent the rear extremity thereof and at the extremities of the cross strut 15. Each of the shelf members supports a pile of resilient rubber cushions 37. The tank bottom 20 is provided with supporting feet 38, one of which rests on each of the piles of rubber cushions 37. A tie bolt 39 connects the members 36 and 38 and holds the cushions 37 in place.

It will be seen from the above that the tank is resiliently supported on the chassis 10, the forward support being provided by the leaf springs 17 and the rearward support by the piles of rubber cushions 37. The cushions 37 provide pivots to allow relative movement of the forward portion of the tank on the springs 17. This four-point resilient support allows the chassis 10 to twist, turn, and tilt without placing any stresses on the tank structure.

It is desired to call attention to the fact that a relatively large water carrying capacity has been provided without increasing the size, weight or height of the truck. The space utilized is ordinarily occupied by longitudinally extending beams supporting a plurality of cross beams which in turn support a heavy platform or deck. All of this has been eliminated in the present invention and the space normally occupied thereby is replaced by the flat self-sustaining tank which, due to its unitary welded construction provides greater cargo carrying capacity than the former cargo body.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for mounting a tank on an automotive chassis comprising: a vertical side plate secured to each side of the forward portion of said chassis and extending therebelow; a pair of spaced-apart spring brackets secured to and projecting outwardly from each of said side plates; a leaf spring secured to and extending between each pair of brackets, said leaf springs being arched upwardly; a spring rest secured to each side of said tank adjacent the forward extremity thereof, each spring rest being secured to the mid-portion of one of said springs; and cushion means supporting the rear of said tank from said chassis.

2. Means for mounting a tank on an automotive chassis comprising: a vertical side plate secured to each side of the forward portion of said chassis and extending therebelow; a pair of spaced-apart spring brackets secured to and projecting outwardly from each of said side plates; a leaf spring secured to and extending between each pair of brackets, said leaf springs being arched upwardly; a spring rest secured to each side of said tank adjacent the forward extremity thereof, each spring rest being secured to the mid-portion of one of said springs; a shelf member projecting outwardly from each side of the rear portion of said chassis; a foot on said tank over each of said shelves; a tie bolt extending from each foot through each of said bracket members; and a pile of resilient members surrounding each bolt and acting as cushioned supports for said tank.

ODIE COLQUITT.

REFERENCES CITED

The following references are of record in the file of this patent:

UNITED STATES PATENTS

| Number | Name | Date |
|---|---|---|
| 1,400,345 | Brile | Dec. 13, 1921 |
| 1,594,233 | Zoelly | July 27, 1926 |
| 2,037,024 | Holby | Apr. 14, 1936 |
| 2,119,772 | Buchanan | June 7, 1938 |
| 2,162,367 | Buchanan | June 13, 1939 |
| 2,395,039 | Crosby | Feb. 19, 1946 |